Oct. 4, 1938.  W. W. FULLER  2,132,023
POWER STEERING APPARATUS
Filed Feb. 18, 1933  2 Sheets-Sheet 1
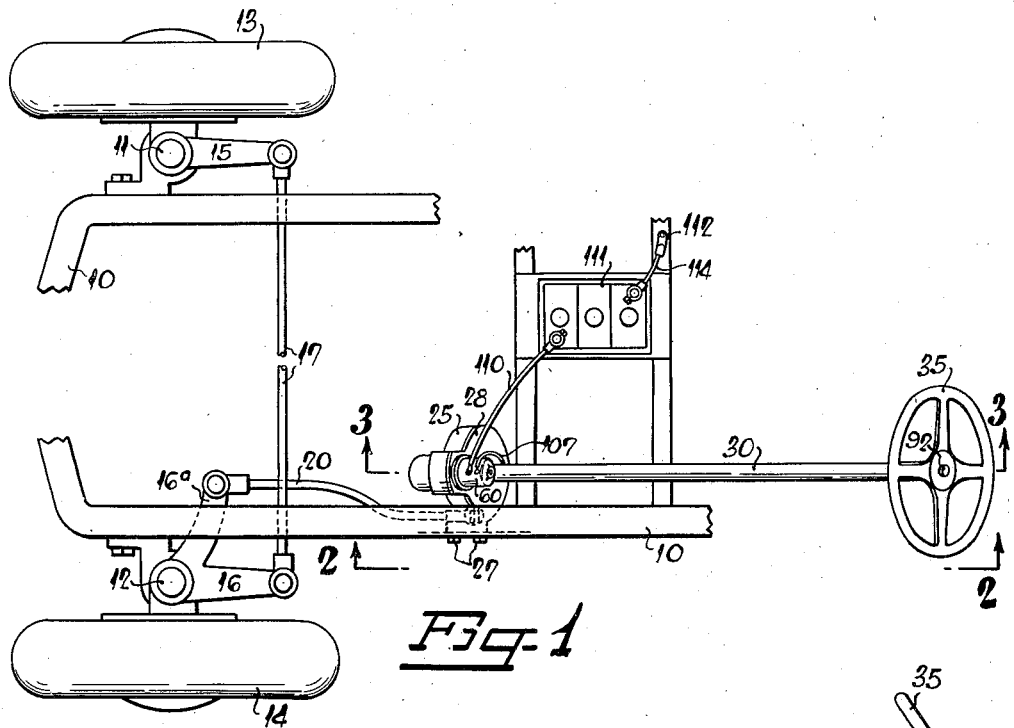
Fig-1
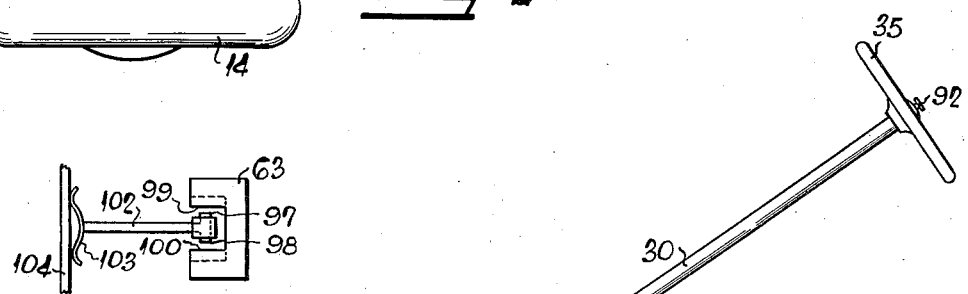
Fig-2
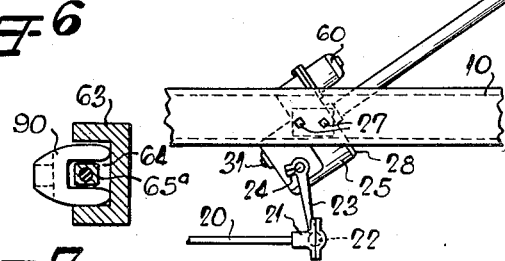
Fig-6
Fig-7
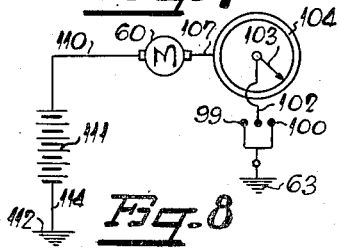
Fig-8
Inventor:
WILLIAM W. FULLER
By
Attorney

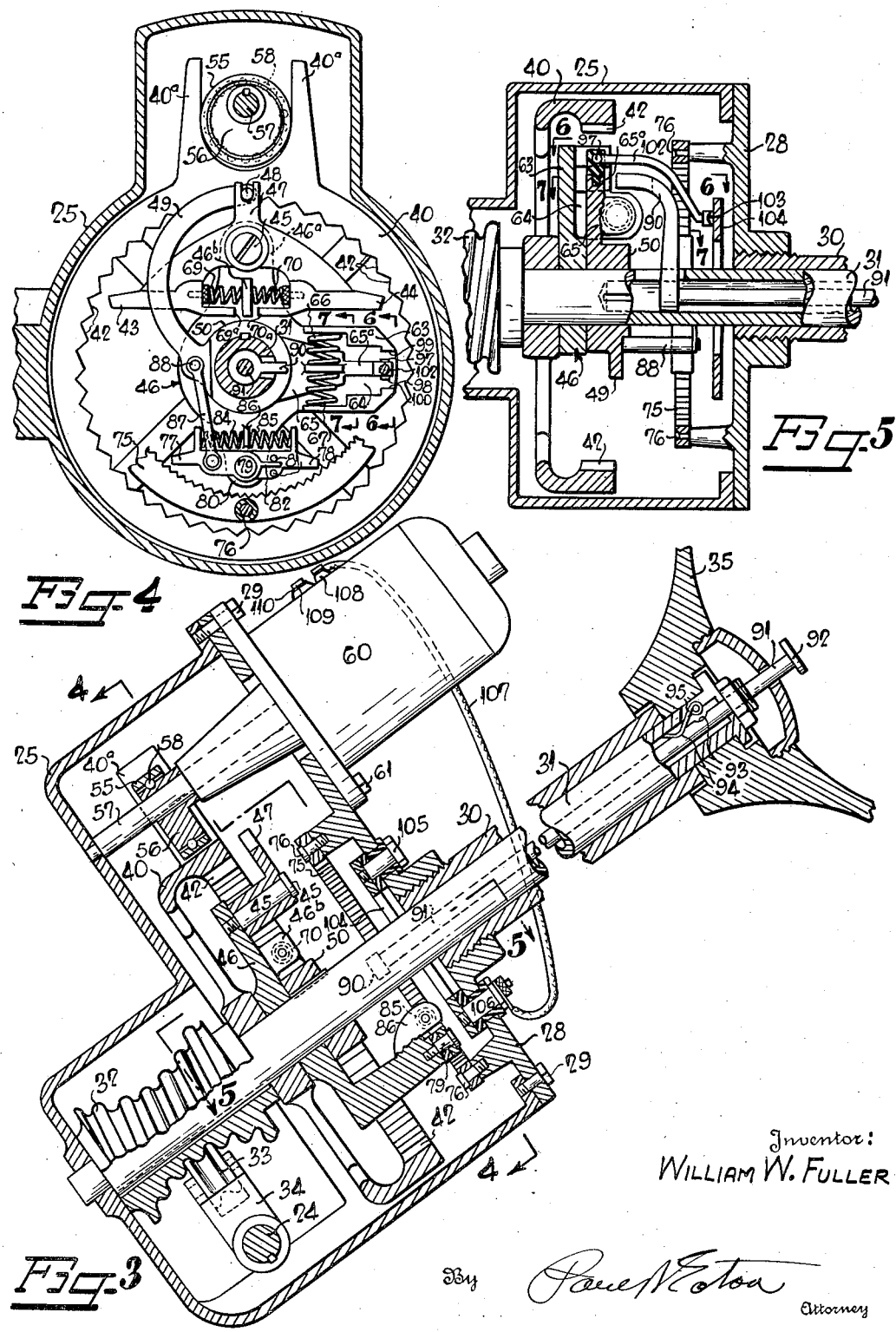

Patented Oct. 4, 1938

2,132,023

UNITED STATES PATENT OFFICE 2,132,023

POWER STEERING APPARATUS

William W. Fuller, Norfolk, Va., assignor to Hermoine Fuller, Norfolk, Va.

Application February 18, 1938, Serial No. 191,284

6 Claims. (Cl. 180—79.1)

This invention relates to an improvement in a power steering apparatus for vehicles in which mechanical impulses are utilized for steering the pilot wheels. This device is particularly adaptable for trucks and tractors where considerable manual effort must be applied to the steering wheel in order to give the pilot wheels the desired turn. For example, when a car, truck or tractor is in a stationary position, the force necessary to turn the pilot wheels is many times greater than the force necessary to turn these same wheels should the vehicle be in motion. This increased resistance to turning is caused partially by the increased bond between the pilot wheels and the supporting surface while in a stationary position. It will also be noted that when in stationary position, if the wheels are only turned a very slight amount the resiliency within the tires will restore the wheels to the original position; consequently it is necessary to hold the steering wheel in the desired position against this resistance offered by the tires. This resiliency in the tires plays a very important part in power steering mechanisms, because it is necessary to use mechanical impulses for moving the pilot wheels gradually in the desired direction. The smaller the impulses used, the more gradual and unnoticeable will be the change. Since very small impulses are used, there must be some means provided to follow up the wheel advancement made by these impulses to hold the wheels in the position placed. Otherwise the tires would return the wheels back to the original position, and the effect of the power steering mechanism would only be to cause the front wheels to shimmy or vibrate.

It is, therefore, an object of this invention to provide a means for producing and utilizing mechanical impulses to turn the steering worm gear of an automobile with a follow-up means for holding the pilot wheels in the position placed by the maximum stroke of these impulses. Such an apparatus will allow very small impulses to be used and consequently the change will be smooth and unnoticeable. In other words, the means for registering and retaining each impulse is provided in this apparatus.

It is another object of this invention to provide a power steering mechanism of the class described together with a suitable switch operable upon the turning of the steering wheels of the automobile to cause a motor to deliver the impulses which cause the pilot wheels to be moved in the desired direction. This switch is normally open when the wheels are directed straight ahead. When the driver fails to follow-up the turning movement of the steering wheel the switch will automatically open and cut off the power to the motor.

It is a further object of this invention to provide a rocker gear concentrically mounted on the steering shaft of an automobile, said rocker gear being driven by impulses from any suitable source of power and means engageable with said rocker gear upon the turning of the steering wheel of the automobile to cause the pilot wheels of the car to be turned in the desired direction by the impulses. This rocker gear has teeth so constructed on the periphery thereof that the engaging means will not stick when contact is made. The contact surface of the engaging means contacts the surface of the tooth at a slight angle thus producing a tendency for the engaging means to slip off the tooth when the pressure on the steering wheel is released. This prevents any locking or sticking effect in the operation of the pawls or engaging means; consequently the steering effect is directly dependent upon how much follow-up pull is applied to the steering wheel.

Some of the objects of the invention having been stated, other objects will appear as the description proceeds when taken in connection with the accompanying drawings, in which—

Figure 1 is a plan view of the front portion of a chassis of an automobile showing my invention applied thereto;

Figure 2 is an elevation taken along the line 2—2 in Figure 1;

Figure 3 is an enlarged vertical sectional view with portions thereof broken away, and taken along the line 3—3 in Figure 1;

Figure 4 is a transverse sectional view taken along the line 4—4 in Figure 3;

Figure 5 is a sectional plan view taken along the line 5—5 in Figure 3;

Figure 6 is a view taken along the line 6—6 in Figures 4 and 5;

Figure 7 is a sectional view taken along the line 7—7 in Figures 4 and 5;

Figure 8 is a schematic wiring diagram showing how the parts of the invention are wired electrically.

Referring more specifically to the drawings, the numeral 10 denotes the chassis of a motor vehicle which has pivotally secured thereto as at 11 and 12 pilot wheels 13 and 14, respectively. These pilot wheels are operated by suitable levers 15 and 16, which levers have the free ends thereof connected to each other by means of tie rod 17. The lever 16 has another arm 16a integral therewith to which is secured one end of a steering link 20, the other end of said link having a socket 21 thereon in which is mounted ball 22. This ball is disposed on the lower end of lever 23 which has its upper end fixedly secured to shaft 24. The ends of shaft 24 are supported for oscillation by housing 25 which housing is secured to the chassis 10 of the automobile by any suitable means such as stud bolts 27.

The housing 25 has a cover 28 secured thereto by any suitable means such as stud bolts 29, and threadably secured in this housing is a cylindrical steering column housing 30 which projects upwardly into the cabin of an automobile near the driver's seat. This housing has rotatably mounted therein a steering column 31, the lower end of said column having a spirally disposed gear 32 fixedly secured thereon. This gear is engaged by a roller 33 which roller is rotatably mounted in the upper end of arm 34, said arm, in turn, being fixedly secured around cross-shaft 24 (Figure 3). The upper end of the column 31 has fixedly secured thereon a steering wheel 35 which is operated by the driver.

When the steering wheel 35 is turned in a clockwise manner in Figure 1, the roller 33 and arm 34 will be moved in a counter-clockwise manner with shaft 24 as a pivot (see Figure 3). This will cause the link 20 in Figures 1 and 2 to be moved to the right and thereby cause the pilot wheels 13 and 14 to turn in a clockwise manner. Of course, when the steering wheel 35 is turned in the opposite direction, the pilot wheels will likewise be turned in the corresponding manner.

In order to provide a power steering mechanism in association with the conventional steering apparatus just described, a ring gear 40 is mounted upon the steering column 31. This gear is concentrically and freely mounted around the steering column 31 so that it may rock in either direction. The inner periphery of ring gear 40 has a plurality of teeth 42 which teeth are adapted to be engaged by pawls 43 or 44, depending upon the direction in which the steering column is turned. Special attention is called to the bevel ends of the pawls 43 and 44 and also the bevel teeth 42. These bevels are so constructed that when the pawl 43 or the pawl 44 is rotated into engagement with the teeth 42, a slight angle will be present between these two surfaces, thereby creating a tendency for the end of the pawl to slide off the teeth when contact is made and thus preventing the two surfaces from sticking together or binding when the gear 40 is oscillated.

The pawls 43 and 44 are constructed from one piece of material which in turn is pivotally mounted as at 45 to the upper end of an arm 46a. This arm is integral with hub 46 which is likewise loosely mounted around steering column 31. Extending upwardly from the member upon which pawls 43 and 44 occur is an arm 47 which is forked at its upper end. This fork is adapted to accommodate a suitable pin 48 which pin projects laterally from upwardly extending arm 49. This arm 49 is integral with hub 50 which is fixedly secured around steering column 31. With the mechanism described, when the steering column 31 is turned in a clockwise manner in Figure 4, the arm 49 will rotate in the same manner and cause the pawls 43 and 44 to rotate in a clockwise manner about a pivot point 45. When this is done, the pawl 43 will move up into engagement with the teeth 42 of gear wheel 40.
The upper portion of ring gear 40 has integral therewith a forked yoke 40a, in which is disposed an eccentrically mounted ring 55. This ring 55 is mounted around eccentric cam 56 which cam is fixedly secured around a motor shaft 57. Suitable balls 58 are disposed between ring 55 and cam 56. The motor shaft 57 extends from a motor 60, said motor being secured to cover 28 by means of bolts 29 and 61. As the motor shaft 57 rotates, a rocking motion will be imparted to gear 40 and its gear teeth 42. With the pawl 43 moved into engagement with the teeth 42 as heretofore described, it is evident that the clockwise rotation of the wheel 40 will also impart a clockwise rotation to the hub 46. The hub member 46 has another radially extending arm 63 integral therewith, said arm having a hollowed-out portion 64 near its outer end. Disposed in this hollowed-out portion is an arm 65 which extends radially from hub 50. The arm 65 is normally held in a centered position in the hollowed-out portion 64 by means of springs 66 and 67, these springs being disposed on the upper and the lower sides of the arm 65 and also within the hollowed-out portion 64. Therefore, when the hub 46 is rotated in a clockwise manner, this rotation is imparted to the arm 65 and the hub 50 through the spring 66 which in turn will cause the steering column 31 to be rotated. On the other hand, let us assume that we desire to turn the steering column 31 in a counter-clockwise manner in Figure 4. Then upon a slight rotation of this shaft, the arm 49 will cause the dogs 43 and 44 to rotate in a counter-clockwise manner about pivot point 45 which, in turn, will cause the pawl 44 to engage the teeth 42.

The rocking motion of the gear 40 will impart a counter-clockwise motion to the pawls and member 46 as well as to the arms 63 and 65. The motion from the arm 63 will be imparted to the arm 65 through the medium of spring 67 thereby causing the shaft 31 to be rotated in a counter-clockwise manner due to the power delivered by the motor 60.

The pawls 43 and 44 are held in a centered position relative to the upstanding arm 46a by means of springs 69 and 70, these springs being disposed upon opposed sides of a projecting lug 46b of the member 46. It is thus seen that when the driver fails to follow up the manual rotation of the steering wheel, the springs 69 and 70 will restore the pawls 43 and 44 to a centered position about the upstanding arm 46 which will cause pawls to become disengaged from the teeth 42 and 43. These springs also furnish an additional means for causing the pawls to be released from engagement with the gear teeth 42. The angularity of the teeth relative to the angularity of the ends of the pawls 43 and 44 also play an important part in insuring that the pawls will not become stuck after once becoming engaged.

It will be noted that the pawls 43 and 44 have integral therewith projecting portions 69a and 70a which are disposed on opposed sides of lug 46b. There is a slight clearance between this lug and portions 69a and 70a when the parts are in the normal position as shown in Figure 4. If, for any reason, the springs 69 or 70 should become inoperative, the portions 69a or 70a will engage the lug 46b upon the turning of the steering column and insure that the pawls 43 or 44 will be rotated into engagement with teeth 42. Where the rotation of the pawls is dependent upon the projections 69a and 70a the apparatus is not quite so sensitive and the action of the pawls will be somewhat delayed; however, it will operate effectively. As long as manual pressure or force is exerted upon the steering wheel 35 in one direction or in the other, one of the dogs 43 and 44 will be held in a position where the teeth 42 will engage the end thereof and for each oscillation or stroke of the gear wheel 40, a corresponding movement will be delivered to the steering column 31, to cause power from the motor to help steer the automobile.

As heretofore stated, these oscillations of the gear member 40 necessarily should be small to make the movement of the pilot wheels gradual and smooth. Where small oscillations are used, it is necessary to provide a follow-up mechanism for holding the advances of the pilot wheels made by these oscillations. There is a degree of elasticity in the automobile tires that will normally return the wheels to the original position, especially if the wheels have not been moved enough to break the bond between the wheels and the surface upon which they rest. Therefore, I have provided a follow-up mechanism which is operated simultaneously with the dogs 43 and 44 just described. This mechanism comprises a toothed ring 75 which is fixedly secured in a stationary position to the cover 28 as at 76, (see Figure 5). Suitable dogs 77 and 78 are adapted to engage these teeth when one of the pawls 43 or 44 is rotated into engagement with teeth 42. The pawls 77 and 78 are pivotally secured as at 79 to downstanding arm 80 of the member 46. The dog 78 has a pair of pins 81 projecting therefrom between which projection 82 of pawl 77 is adapted to loosely fit.

The dogs 77 and 78 move substantially at the same time, although they are held in a centered position about the downstanding arm 80 by any suitable means such as springs 84 and 85, said springs being disposed on opposed sides of lug 86 which projects from the downstanding leg 80. A suitable link 87 has its lower end connected to dog 77 and its upper end connecting to hub 50 as at 88.

When the steering column 31 is turned in a clockwise manner, the dog 43 will engage teeth 42 and at the same time the dogs 77 and 78 will be rotated in a clockwise manner to cause the dog 78 to engage the teeth in gear 75. Since these dogs move simultaneously it is seen that any advance made by the pawl 43, as a result of its contact with teeth 42, will be held by the dog 78 which engages the stationary ring gear 75. Conversely, when the shaft 31 is turned in a counterclockwise manner, pawl 44 will engage teeth 42 and at the same time the pawl 77 will engage the teeth in the stationary ring 75 to follow up the advances that are made in the opposite direction. Such a device furnishes a means for controlling the stepping-up, resulting from the impulses, and prevents any back-lash upon the steering column due to the tendency of the pilot wheels to return to the original position, or due to the oscillation created by the cam 56. There are twice as many notches in ring 75 as in ring gear 40; therefore if the ring gear is only rotated one-half notch, the movement resulting from this advance will be held.

It is frequently desired to operate the steering device manually without aid of power steering. When such is desired, it is only necessary to provide means for rigidly securing the arm 65 to the arm 63 so that no relative rotation can take place between the two members. When this is done, there will be no possibility of an electrical contact being created.

This rigid connection between the arms 65 and 63 is established by means of a suitable forked member 90 (Figures 5 and 7). The forked end of member 90 fits over the portion 65a of arm 65 when the members 63 and 65 are connected together. This arm is shown in this position in Figure 7 at which time manual steering only can be accomplished. In Figure 5, the arm 90 is shown in a disconnected position, at which time power steering is accomplished. The forked end of arm 90 is adaped to straddle the portion 65a and fit into the cavity or hollowed-out portion 64 in the arm 63. The prongs of the forked member 90 are of such a thickness as to substantially fill up the space 64 not occupied by the portion 65a of the arm 65, and when the forked member is placed in the position shown in Figure 7 the arms 63 and 65 must move together. The arm 90 is fixed on the lower end of a rod 91 which rod is disposed within the steering column 31. The upper portion of rod 91 has a suitable button 92 on the upper end thereof. Suitable notches 93 and 94 are cut in the periphery of rod 91 and these notches are adapted to be engaged by a suitable spring 95 to hold the rod in the position placed.

With the spring 95 engaging notch 94 as shown in Figure 3, the forked member 90 is pulled to a disengaged position as shown in Figure 5. When the notch 93 is pushed downwardly into engagement with the spring 95, the forked member 90 will straddle the portion 65a as shown in Figure 7, and in this position, any rotation which is imparted to the arm 63 will likewise impart the same amount of rotation to the arm 65. This will prevent the electrical contacts 97 or 98 from contacting the conductive surfaces 99 or 100. Since it is necessary that one of these contacts be made in order that the circuit to the motor 60 be established, it will be impossible for power steering mechanism to be brought into play, with the forked member 90 in the position shown in Figure 7.

Leading from the contacts 97 and 98 is a conductive rod 102. This rod has a brush 103 on its outer end which normally presses against conductive ring 104, said ring being secured to cover 28 by any suitable means such as bolts 105 and 106. Bolt 106 also acts as a conductive member to which one end of wire 107 is attached. This wire has its other end secured to motor 60 as at 108. Leading from the other side of motor 60 as at 109 is another wire 110, which wire is connected to the positive terminal of battery 111. The battery 111 is grounded as at 112 by wire 114.

Whenever the steering column 31 is rotated to cause either dogs 43 or 44 to engage the teeth 42, one of the contacts 97 or 98 will contact surfaces 99 or 100 to cause the circuit to be completed, at which time the current will be allowed to flow from the battery 111 through wire 110 to motor 60, wire 107, conductive ring 104, brush 103, member 102, and to the member 63 which acts as a ground. Likewise in this case, when the driver fails to follow-up the advance made by the steering mechanism, the springs 66 and 67 will center the arm 65 relative to the arm 63 at which time neither of the contacts 97 or 98 will come into engagement with the surfaces 99 or 100. Therefore, the motor 60 will stop. By using such a device, it is seen that the motor is only operated when it is necessary to deliver the power, resulting in a very efficient steering mechanism.

It is, therefore seen that I have provided a power steering mechanism which may be installed at any point along the steering column to assist the driver in directing the pilot wheels to the desired position.

In the drawings and specification there has been set forth a preferred embodiment of the invention and although specific terms are employed they are used in a generic and descriptive sense only and not for the purposes of limitation, the scope of the invention being set forth in the appended claims.

I claim:

1. Power steering apparatus for motor vehicles comprising a steering column provided with a steering wheel, a housing surrounding a portion of said steering column intermediate its ends, a ring gear having internal teeth and being mounted for oscillation on the steering column, a member loosely mounted on said column, a pawl member mounted for oscillation on said member and having a pair of oppositely directed pawls thereon adapted to engage said ring gear one at a time during a steering operation, said pawl member having a slot therein, a member fixed on said steering column and having an arm provided with a pin for engaging said slot and imparting swinging movement to said pawl member to cause one of the pawls to engage the teeth of said gear, said first member having a pair of spaced contact points, said fixed member having a second arm provided with a pair of contacts for engaging one of the first pair of contacts when the steering column is rotated, an electric motor having a circuit of which the spaced contact points form a part, a second ring gear fixed on the interior of said housing, a second pair of oppositely directed pawls mounted in said first member and engageable one at a time with said second ring gear, a link pivoted to said fixed member and to said last-named pawls for causing the last-named pawls to engage said second gear when the first pawls engage the first gear to thereby hold the first pawls in position to prevent retrograde movement of the steering column.

2. Power steering apparatus for motor vehicles, comprising a steering column provided with a steering wheel, a housing surrounding a portion of said steering column intermediate its ends, a ring gear having internal teeth and being mounted for oscillation on the steering column, a member loosely mounted on said column, a pawl member mounted for oscillation on said member and having a pair of oppositely directed pawls thereon adapted to engage said ring gear one at a time during a steering operation, said pawl member having a slot therein, a member fixed on said steering column and having an arm provided with a pin for engaging said slot and imparting swinging movement to said pawl member to cause one of the pawls to engage the teeth of said gear, said first member having a pair of spaced contact points, said fixed member having a second arm provided with a pair of contacts for engaging one of the first pair of contacts when the steering column is rotated, an electric motor having a circuit in which the spaced contact points form a part, a second ring gear fixed on the interior of said housing, a second pair of oppositely directed pawls mounted in said first member and engageable one at a time with said second ring gear, a link pivoted to said fixed member and to said last-named pawls for causing the last-named pawls to engage said second gear when the first pawls engage the first gear to thereby hold the first pawls in position to prevent retrograde movement of the steering column, and manually controlled means for preventing relative movement between the first member and the fixed member to prevent energization of the motor and also prevent the first pawls from engaging the ring gear upon turning movement of the steering column.

3. Power steering apparatus for motor vehicles having a steering column, a casing surrounding a portion of the steering column intermediate its ends, an electric motor having a single circuit for energizing said motor to run in one direction only, a member mounted for oscillation by said motor, means movable by rotation of the steering column for closing the circuit to said motor to oscillate said member, and means also movable by rotation of the steering column for connecting the steering column to said oscillating member to deliver force from the motor to the steering column.

4. Power steering apparatus for motor vehicles having a steering column, a casing surrounding a portion of the steering column intermediate its ends, an electric motor having a single circuit for energizing said motor to run in one direction only, a member mounted for oscillation by said motor, means movable by rotation of the steering column for closing the circuit to said motor to oscillate said member, means also movable by rotation of the steering column for connecting the steering column to said oscillating member to deliver force from the motor to the steering column, and additional means movable by turning movement of the steering column for preventing retrograde movement of the steering column as long as manual pressure is applied to move the steering column in the selected direction.

5. Power steering apparatus for motor vehicles having a steering column, a casing surrounding a portion of the steering column intermediate its ends, an electric motor having a single circuit for energizing said motor to run in one direction only, a member mounted for oscillation by said motor, means movable by rotation of the steering column for closing the circuit to said motor to oscillate said member, means also movable by rotation of the steering column for connecting the steering column to said oscillating member to deliver force from the motor to the steering column, and manually operable means for preventing movement of the means movable by the steering column and also preventing energization of the motor upon movement of the steering column.

6. Power steering apparatus for motor vehicles having a steering column, a casing surrounding a portion of the steering column intermediate its ends, an electric motor having a single circuit for energizing said motor to run in one direction only, a member mounted for oscillation by said motor, means movable by rotation of the steering column for closing the circuit to said motor to oscillate said member, means also movable by rotation of the steering column for connecting the steering column to said oscillating member to deliver force from the motor to the steering column, additional means movable by turning movement of the steering column for preventing retrograde movement of the steering column as long as manual pressure is applied to move the steering column in the selected direction, and manually operable means for preventing movement of the means movable by the steering column and also preventing energization of the motor upon movement of the steering column.

WILLIAM W. FULLER.